United States Patent [19]

Fleming, Jr. et al.

[11] Patent Number: 5,159,733
[45] Date of Patent: Nov. 3, 1992

[54] TENTER-TYPE STRETCHER HAVING MEANS FOR DETECTING CLIP OBSTRUCTIONS

[75] Inventors: Robert L. Fleming, Jr., Hendersonville; Walter F. Hart, Jr., Pisgah FOrest; Edward V. Lindall, Jr., Rosman; Ronnie D. Reid, Lake Taxaway, all of N.C.; John A. Stewrat, III, Pickerington, Ohio

[73] Assignee: E. I. Du Pont de Nemours and Company, Wilmington, Del.

[21] Appl. No.: 769,855

[22] Filed: Oct. 2, 1991

[51] Int. Cl.$^5$ .............................................. D06C 3/04
[52] U.S. Cl. ....................................................... 26/93
[58] Field of Search ................. 28/89, 51.4, 51.5, 52, 28/93, 74, 75, 79; 19/80 R, 239; 264/210.7

[56] References Cited

U.S. PATENT DOCUMENTS

| | | | |
|---|---|---|---|
| 663,528 | 12/1900 | Whiteley et al. | 26/93 |
| 880,946 | 3/1908 | Whitley | 26/93 |
| 2,312,182 | 2/1943 | Meyer | 26/75 |
| 3,071,157 | 1/1963 | Robertson et al. | 26/75 |
| 3,789,975 | 2/1974 | Ida et al. | 198/180 |
| 4,176,429 | 12/1979 | Rottensteiner | 26/93 |
| 4,879,788 | 11/1989 | Suzuki et al. | 26/94 |

FOREIGN PATENT DOCUMENTS

| | | |
|---|---|---|
| 62-212126 | 3/1986 | Japan . |
| 607864 | 5/1978 | U.S.S.R. ................ 26/75 |

OTHER PUBLICATIONS

Japanese unexamined patent application 62-212,126 Abstract attached.
Japanese unexamined patent application 61-140,447 Abstract attached.

Primary Examiner—Werner H. Schroeder
Assistant Examiner—Amy Brooke Vanatta

[57] ABSTRACT

An improved tenter-type stretcher comprises a pair of rails which diverge from one another, a plurality of clips carried in endless chains along the rails and a device for detecting obstructions in the tenter clips, wherein the detecting device is either a mechanical arm positioned to contact and move upon encountering foreign matter in the clips or a light beam which traverses the clips, and is interrupted by foreign matter in the clips.

10 Claims, 4 Drawing Sheets

TENTER-TYPE STRETCHER HAVING MEANS FOR DETECTING CLIP OBSTRUCTIONS

FIELD OF THE INVENTION

This invention relates generally to tenter-type stretchers for the widthwise or lateral stretching of a web of material. More particularly, this invention relates to means for detecting obstructions in the clips of such stretchers.

BACKGROUND OF THE INVENTION

Tenter-type stretchers are generally known in the art and are used in diverse manufacturing operations for stretching laterally a web of material as it is transported longitudinally. Examples of such stretchers are discussed and taught by Suzuki et al., U.S. Pat. No. 4,879,788.

Tenter-type stretchers basically comprise a pair of endless chains or belts disposed in spaced relation to one another. The spacing between the chains increases from the entrance of the stretcher to the exit. A plurality of clips are carried by the chains and are adapted to engage and retain the slevedge edge of the web of material (hereinafter referred to as "film") at the entrance of the stretcher. As the film travels from the entrance to the exit of the stretcher, the film is laterally stretched by the increasingly divergent orientation of the endless chains. At the exit of the stretcher, the clips are activated, usually by mechanical means, to release the film edge and return to their closed position prior to being again engaged with advancing, unstretched film.

In the production of film, particularly films of polymeric or thermoplastic material, it is often necessary or desirable for the stretching operation to occur at an elevated temperature. In these situations, the endless chains are often routed through one or more heating zones to warm the film while it is being stretched laterally.

A common problem in the production of film is that the film can tear, break or stretch unevenly. Such problems can be caused by a number of factors, such as impurities in the film, defects due to poor film formation and improper orientation of the tenter clips relative to the film. Another common cause of film breakage or improper stretching is due to obstructed clips which fail to properly engage or secure the film during the stretching operation. Such obstructions can result from torn remnants of film being lodged in the clip, accumulated deposits of oil and dirt, broken clips, etc.

When a problem of film breakage or improper stretching is detected, it is necessary to cease operation of the stretcher to diagnose the cause, which includes the time-intensive task of visually inspecting the multitude of clips to determine whether they are operating properly and are free from obstructions. This task is even more burdensome when a heating zone is being used in that a number of the clips will not be readily accessible for inspection.

A number of devices are known in the art which address themselves to correcting the problems noted above that are caused by obstructed or improperly aligned clips. Hida and Tsutsui, Japanese Unexamined Application [Kokai]62-212,126, for example, discloses a device which detects the orientation of tenter clip, compares it to a reference standard and, if the orientation is found unacceptable, marks the location of the defective clip. This reference does not address itself to the problems due to obstructed, as opposed to misaligned, clips.

Ida and Tobita, U.S. Pat. No. 3,789,975 device for freeing obstructions in tenter clips, which comprises a liner for such clips having an upwardly extending tongue to prevent torn pieces of film from becoming lodged behind the clip lever and means for directing a stream of pressurized air from behind the clip to eject any foreign matter therein.

Another type of device for cleaning the surfaces of tenter clips is known from Rottensteiner, U.S. Pat. No. 4,176,429. That reference discloses a device comprising a plate-like member having brushes disposed thereon whereby the brushes scrub the film-engaging surfaces of deposits and incrustations.

Neither of these last mentioned references address themselves to detecting obstructions which prevent proper clip operation. It has been found that detecting obstructions in the clips greatly reduces the amount of down-time of the tenter stretcher, greatly reduces the incidence of torn, broken or damaged film due to clip malfunction, increases manufacturing efficiency and reduces costs.

SUMMARY OF THE INVENTION

Briefly stated, the present invention comprises an improved tenter-type stretcher for the widthwise stretching of a web of material as the web of material is longitudinally carried from an entrance of the tenter to an exit thereof, wherein the improvement comprises means for detecting obstructions in the tenter clips while the clips are not engaged with the web of material.

In one embodiment, the means for detecting obstructions comprises a mechanical arm position to traverse the inner portion or throat of the tenter clip while the clip is an an open or unclipped position as it is being propelled along the rails of the tenter. If no obstruction is present, the arm traverses the clip without incident. In the event that an obstruction is present in a tenter clip, the obstruction will strike the mechanical arm causing it to rotate. The rotation of the arm is detected by any conventional device, such as mechanical, electrical or photosensitive detectors. As may be desired in the particular circumstances, the rotation of the arm may be made to cause an immediate stoppage of the tenter, an alarm to sound or any number of other variations to alert the operator of an obstructed clip.

In a preferred embodiment, the means for detecting obstructions comprises a light source which emits a light beam to traverse the throat of the clips as they are being propelled along the rails and a light detector. When an obstruction is present in the clip, the light beam is interrupted which interruption is detected by the light detector. As in the previously described embodiment, the interruption can be made to alert the operator of an obstruction. In the best mode of the invention, the light source and the light detector comprise the same unit and a reflector is employed to reflect the light beam from the source back to the detector.

Accordingly, it is the primary object of the invention to provide a tenter-type stretcher having means for detecting obstructions in the tenter clips.

It is a further object of the invention to provide a tenter for widthwise stretching of a web of material, comprising:

rail means defining an entrance and an exit of said tenter, said rail means diverging from one another from said entrance to said exit;

b) a plurality of clips, each of said clips having means for releasably engaging a slevedge edge of a web of material;

c) means for propelling said clips along said rail means; and d) means for detecting obstructions within said clips while the clips are not engaged with the web of material.

It is a further object of the invention to provide a mechanical arm positioned to traverse the throat of the tenter clips while the clips are in an open position and mounted to rotate upon being contacted by an obstruction therein.

It is still a further object of the invention to provide a light source having a light beam directed to traverse the throat of tenter clips and a light detector to detect interruptions in the beam.

These and other objects of the invention will become apparent upon a further reading of the specification with reference to the drawing figures and the appended claims.

BRIEF DESCRIPTION OF THE DRAWING FIGURES

DETAILED DESCRIPTION OF THE EMBODIMENTS

Figure 1:
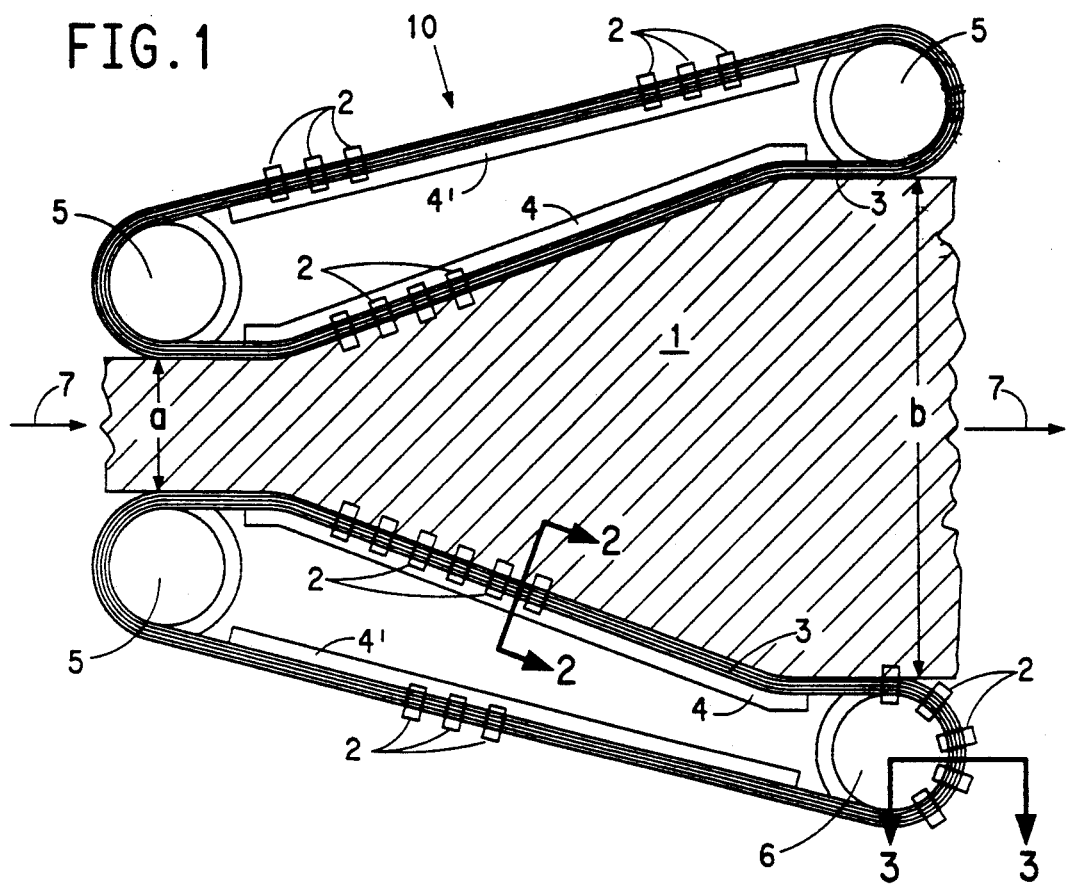
FIG. 1 is a schematic representation, in plan, of a typical tenter-type stretcher used in the widthwise stretching of film.

With reference first being made to FIG. 1, illustrated therein is a schematic representation of a typical tenter-type stretcher, designated generally at 10. Tenter 10 comprises a pair of spaced apart endless chains 3 having a plurality of tenter clips 2 rigidly connected thereto. The endless chains 3 and tenter clips 2 are carried by idler wheels 5 and propelled by motor-driven wheels 6, which are synchronized relative to one another, whereby the endless chains 3 move in the same direction and at the same speed. Each of the endless chains 3 are directed into divergent paths relative to one another by a pair of rails 4,4'. As also seen in FIG. 1, film 1 enters the tenter at a point where the spacing between the endless chains 3 is at a minimum, such point being referred to as the "entrance". As the film 1 enters the tenter, it has a pre-determined width, designated "a" in FIG. 1. The plurality of tenter clips 2 then engage the slevedge edge of the film 1 in a manner described more fully hereinbelow. As the film 1 is then transported longitudinally through the tenter in the direction indicated by arrows 7 in FIG. 1, the film is stretched widthwise or laterally to a predetermined width "b".

For purposes of clarity, FIG. 1 does not depict the heating zone(s) which, as noted above, may be desirable or necessary to use in connection with the tenter to properly stretch the film.

Figure 2:
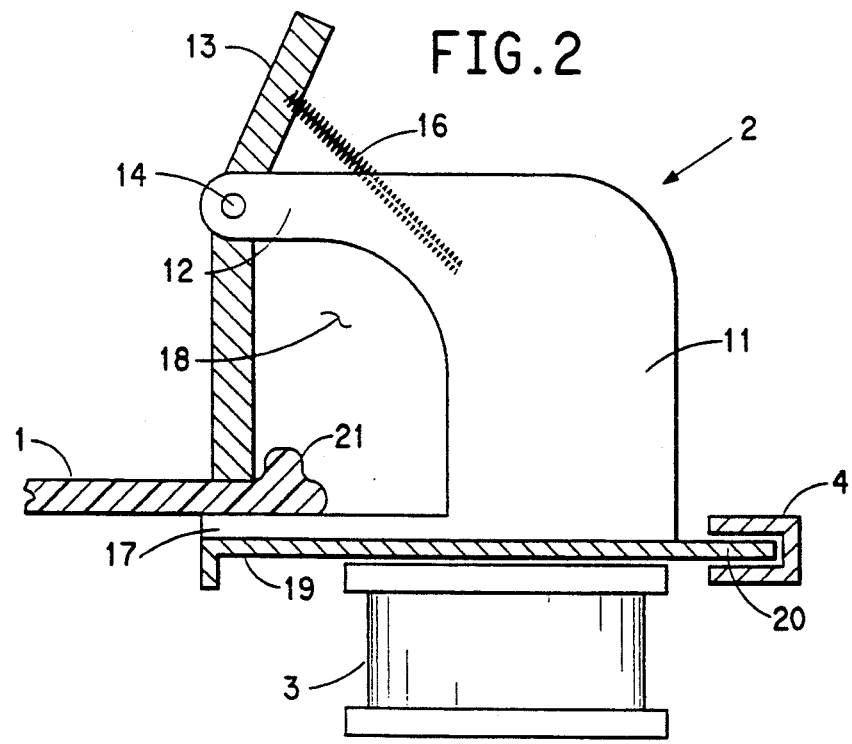
FIG. 2 is a side elevational view, partially sectioned, of a typical tenter clip, shown in engagement with a slevedge edge of a film, as seen along line 2—2 of FIG. 1.

With reference now being had to FIG. 2, illustrated therein is a typical tenter clip of a type useable with the present invention as seen along line 2—2 of FIG. 1. As seen in FIG. 2, tenter clip 2 comprises a body 11 having forwardly extending appendages 12 at an upper surface thereof. A lever 13 is pivotally connected to appendages 12 by a pivot pin 14 which traverses appendages 12 and lever 13. A spring 16 is connected to lever 13 and clip body 11 to bias the lower portion of lever 13 away from clip body 11 (i.e., into the closed or clipped position). Upper and lower, when describing the lever 13, refers to the orientation of the lever relative to appendages 12.

A clip base 17 is secured to clip body 11 at the lower surface thereof, that is, the surface opposite appendages 12. The clip body 11, lever 13, appendages 12 and clip base 17 define a void or space 18, which is commonly referred to, and is herein referred to, as the throat of the clip. The clip base 17 is rigidly affixed to a generally flat, plate-like bracket 19 which, in turn, is affixed to the endless chain 3 whereby bracket 19 and clip 2 move with chain 3.

Bracket 19, as seen in FIG. 2 is slightly deeper in dimension than the clip base 17, to form a tab-like extension 20 at the rear of the clip 2. The extension 20 cooperates with rail 4, which as seen in FIG. 2 is substantially U-shaped in cross-section, to guide the clips 2 and endless chains 3. To insure proper operation, it is necessary to maintain sufficient tension on endless chains 3 so that extension 20 of bracket 19 is kept in rail 4 (or rail 4').

As film 1 enters the tenter, the tenter clips 2 engage the slevedge edge of the film and the film is pinched between the clip base 17 and lever 13 of clip 2. As seen in FIG. 2, this pinching action grips a pre-formed bead 21 at the edge of film 1. The film 1 is then retained by tenter clips 2 in the manner shown in FIG. 2 as the web is laterally stretched until lever 13 of clip 2 is released at the exit end of the tenter.

Figure 3:
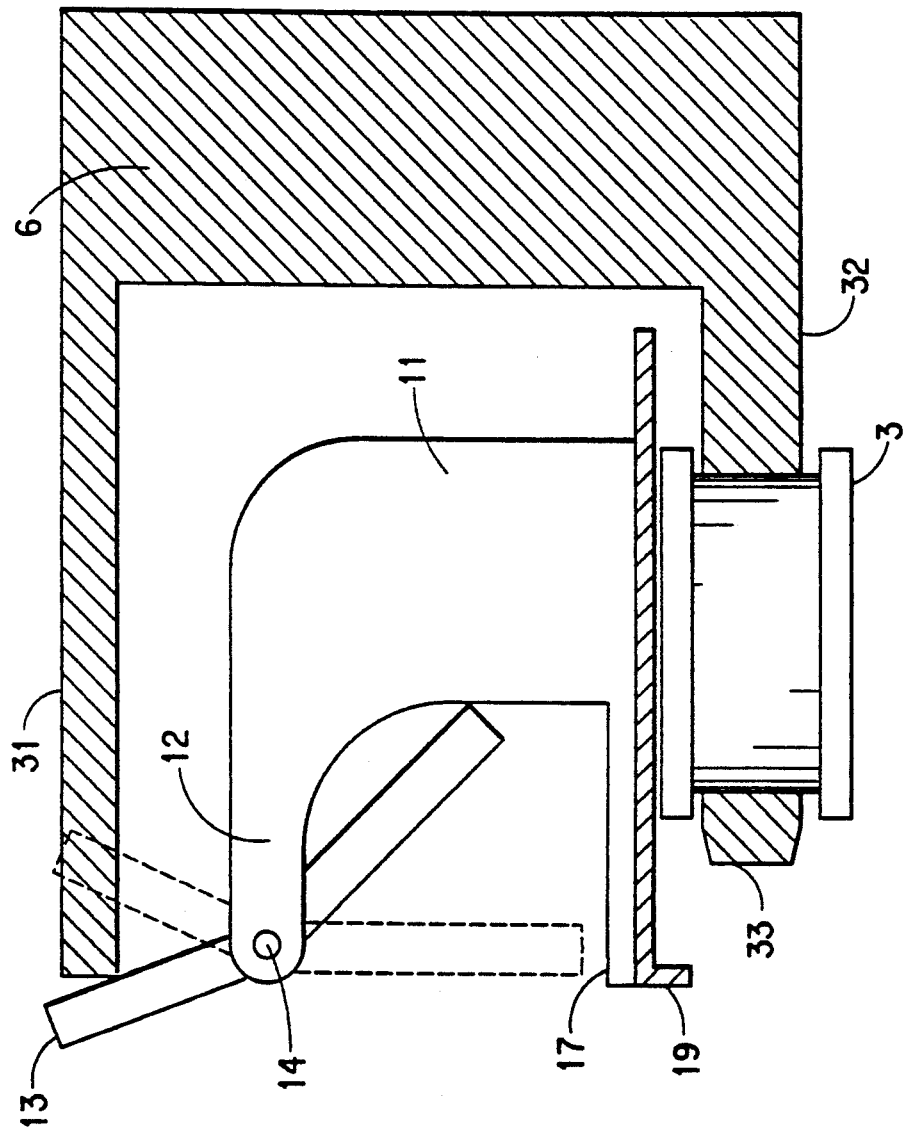
FIG. 3 is a fragmentary, partially sectioned, side elevational view of a typical tenter clip similar to FIG. 2, particularly illustrating the movement of the clip lever between the open, or unclipped, position and the closed, or clipped, position, as seen along line 3—3 of FIG. 1.

FIG. 3 illustrates the pivotal movement of lever 13 between the open, or unclipped position and the closed, or clipped position, the former being illustrated in solid lines in FIG. 3. The movement of lever 13 and thereby the release of the film, is caused by the mechanical actuation of the upper portion of lever 13. In the instance of FIG. 3 this mechanical actuation comprises an outwardly extending abutment 31 affixed to drive wheels 6 of tenter 10. Abutment 31 may be formed comprise a separate flange securely fastened to the wheel. Any of the other known means for actuating the lever 13, such as those described in Suzuki et al., U.S. Pat. No. 4,879,788 are also suitable.

As is known, the wheels 5, 6 are provided with gears 32 having teeth 33 which are in meshed engagement with endless chains 3. Synchronized drive wheels 6 are driven under power to propel the endless chains 3 and, thus, clips 2.

As mentioned previously herein, it has been observed in the operation of tenter stretchers that the throat of the tenter clips become obstructed whereby the lever 13 cannot return to the closed position illustrated in broken lines in FIG. 3, and thus is ineffective to engage and retain the slevedge edge of the film. The present invention is designed to detect such obstructions and to alert the tenter operation so that appropriate corrective action may be taken.

Figure 4:
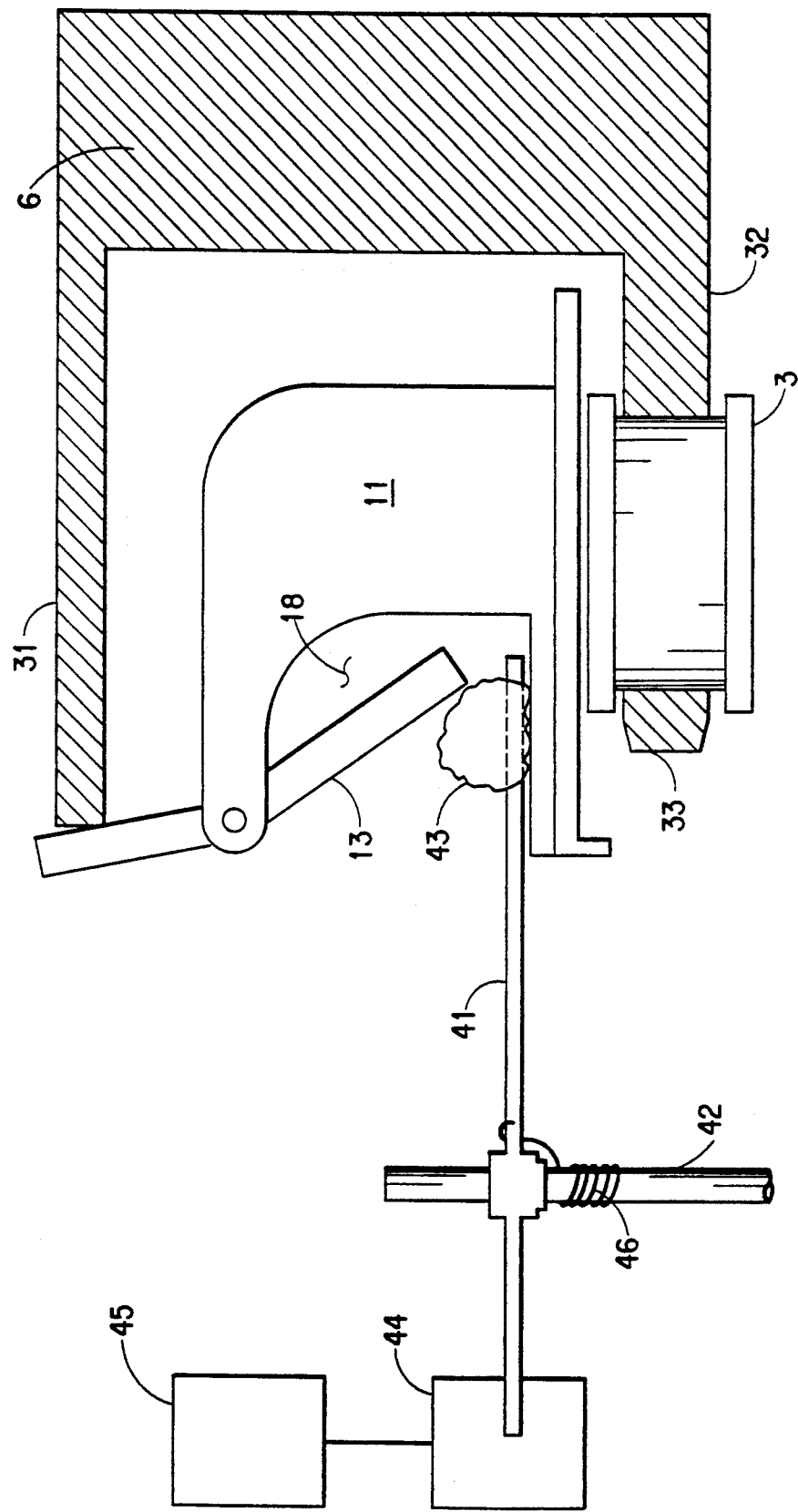
FIG. 4 is a partially sectioned, side elevational view of one embodiment of the present invention, wherein the means for detecting obstructions comprises a mechanical arm.

One embodiment of the detecting means of the present invention is illustrated in FIG. 4. In this embodiment, an arm 41 is pivotally mounted to a support which is positioned such that arm 41 extends into the throat 18 of clip 2, while lever 13 is in the open position. If an obstruction 43 is present, it will strike arm 41 and cause arm 41 to pivot relative to shaft 42.

Although the pivoting of arm 41, in and of itself will give the operator an indication that an obstructed clip has been detected, such is dependent entirely upon the alertness of the operator. It is thereby preferable for the arm 41 to be operatively engaged with a device which will detect movement of the arm and activate an alerting device 45 which will alert the tenter operator that an obstruction has been detected. It is to be understood that the detection device 44 may be of any known means for detecting movement, such as mechanical, electrical, or photosensitive detectors. Likewise, the alerting device 45 may be an audible signal, a visual signal, or combinations thereof. If desired, the alerting device 45 may be the tenter itself whereby an automatic shutdown, or a reduction of speed would result upon movement of arm 41. It is preferable for the alerting device 45 to remain actuated until acknowledge by the tenter operator and, if desired, can be interfaced with other detection devices (not shown) such as, for example, to register clip location.

The particular size and shape of the arm 41 is not important, so long as arm 41 extends sufficiently into throat 18 so as to be able to contact any obstructions therein which may prevent lever 13 from becoming engaged with the film and, obviously, arm 41 must be of such dimension that it will physically fit within the clearance (typically ¼ inch) between lever 13 and clip base 17. If desired, a spring 46 may be employed to bias the arm 41 into the position shown in FIG. 4, where it is ready to traverse the next clip. It is essential that support 42 be located such that arm 41 will traverse the throat of the clips when the lever 13 is in an open position, such as in the proximity of idler wheels 5 or drive wheels 6.

Figure 6:
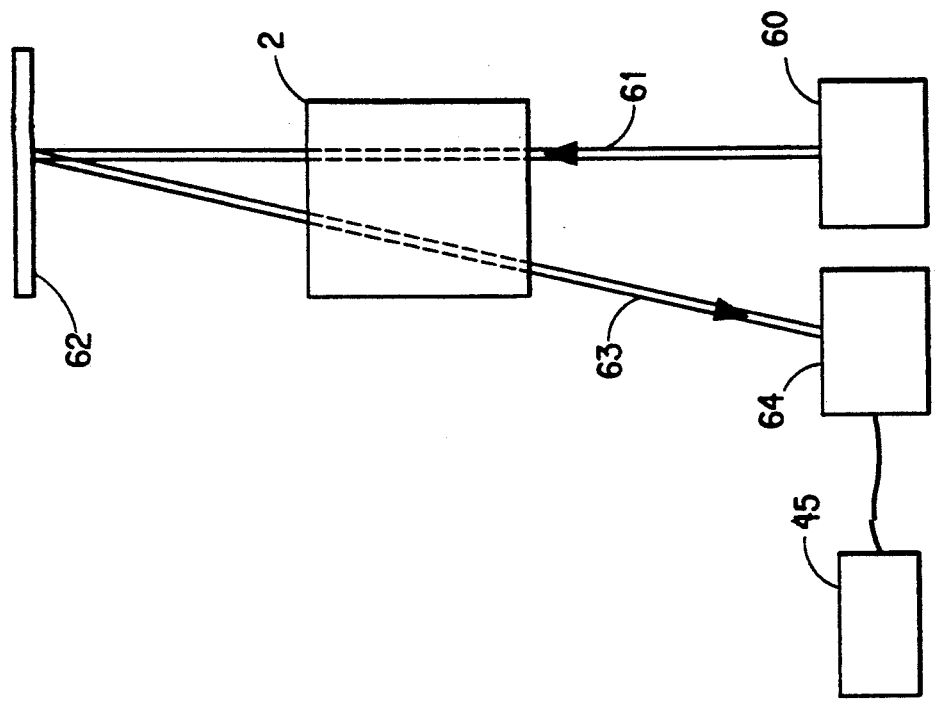
FIG. 6 is a schematic representation, in plan, of a preferred embodiment of the present invention, wherein the means for detecting obstructions comprises a light source, a reflector and a light detector.
Figure 5:
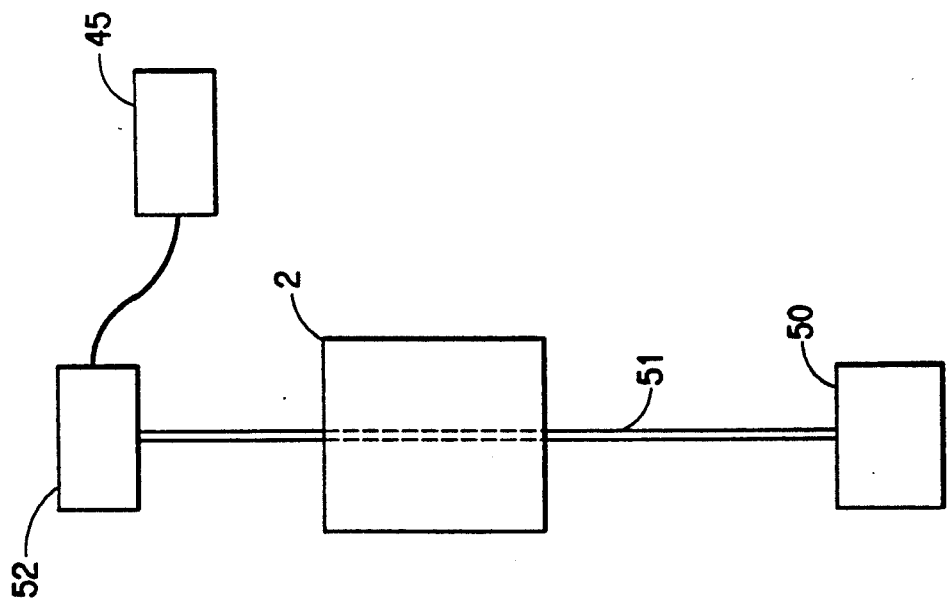
FIG. 5 is a schematic representation, in plan, of another embodiment of the invention, wherein the means for detecting obstruction comprises a light source and a light detector.

FIGS. 5 and 6 are schematic illustrations, in plan, of preferred embodiments of the present invention, wherein the means for detecting obstructions in the tenter clips comprises a light beam, with the embodiment of FIG. 6 being most preferred. In the embodiment of FIG. 5, a light source or light emitter 50 is positioned to emit a beam of light 51 through the throat of clip 2 while the clip lever is an open position. A light detector 52 detects the presence, or absence of the light beam 51 and is positioned on the opposite side of clip 2 as light source 50. If an obstruction is present in clip 2, the light beam 51 will be interrupted and the light detector 52 will actuate the alerting device 45 as aforesaid.

In the most preferred embodiment of FIG. 6, a light source 60 emits a beam of light 61 through the throat of clip 2. After traversing the clip, the light beam strikes a reflector 62 which reflects the light beam in a reflected path 63 back through the throat of clip 2 to a light detector 64 which is operatively connected to an alerting device 45. The detector 64 and emitter 60 can be, and preferably are, a single retroreflective sensor unit such as Mini-Beam ™, Model #SM2A312LV by Banner Engineering Corporation, Minneapolis, MN.

As in the previously embodiment, the light emitters 50, 60 should be mounted at a point where the clip levers are in an open position. As may be desired in the particular circumstances, the light emitter may be in continuous or pulsed operation, may be made to traverse only one or many clips simultaneously, and additional reflectors may be employed to optimize equipment placement. In addition, the beams emitted by light emitters 50, 60 should be able to freely traverse an unobstructed clip. In clips having ¼ inch clearance between lever 13 and clip base 17, a ⅛ inch beam is preferred.

What is claimed is:

1. A tenter for widthwise stretching of a web of material, comprising:
    a) at least two spaced apart rails defining an entrance and an exit of said tenter, said rails diverging from one another from said entrance to said exit;
    b) a plurality of clips, each of said clips having means for releasably engaging a slevedge edge of a web of material;
    c) means for propelling said clips along said rails; and
    d) means for detecting obstructions within said clips while the clips are not engaged with a web of material.

2. The tenter of claim 1, wherein said means for detecting obstructions comprises mechanical means.

3. The tenter of claim 2, wherein said mechanical means comprises an arm pivotally connected to a support, wherein said arm is positioned to be moveably contacted by obstructions in said clips.

4. The tenter of claim 3, further comprising means for detecting movement of said arm and alerting means operably connected to said movement detecting means, said alerting means comprising means for alerting a tenter operator to movement of said arm.

5. The tenter of claim 3, wherein said mechanical means further comprises biasing means for biasing said arm into a position for being moveably contacted by obstructions in said clips.

6. The tenter of claim 5, wherein said biasing means comprises a spring connected to said arm and to said support.

7. The tenter of claim 1, wherein said means for detecting obstructions comprises means for emitting a beam of light to traverse said clips and means for receiving said beam of light after it traverses said clips.

8. The tenter of claim 7, further comprising alerting means operatively connected to said light receiving means for alerting a tenter operator to interruptions in receiving said beam of light.

9. The tenter of claim 7, wherein said means for detecting obstructions further comprises at least one reflector for reflecting said light beam from said means for emitting a light beam to said means for receiving a light beam.

10. The tenter of claim 9, wherein said means for emitting a light beam and said means for receiving a light beam comprise a single retroreflective sensor unit.

* * * * *